Patented Nov. 23, 1948

2,454,683

UNITED STATES PATENT OFFICE 2,454,683

METALLIZABLE POLYAZO DYESTUFFS

Walter Wehrli and Charles Petitjean, Basel, Switzerland, assignors to Sandoz Limited, Basel, Swtzerland No Drawing. Application April 12, 1946, Serial No. 661,863. In Switzerland April 16, 1945

6 Claims. (Cl. 260—166)

The present invention relates to new metallizable polyazo dyestuffs.

It has been found that valuable metallizable polyazo dyestuffs can be obtained by causing 1 mole of resorcinal to react in any order of succession, on the one hand, with 1 mole of a diazotized aminazo dyestuff of the general formula

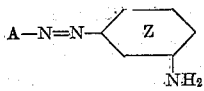

wherein A represents the radical of a diazo or coupling component, which radical may contain neither diazotisable amino groups nor carbon atoms which are capable of coupling, but may contain azo groups, one hydroxyl group in o-position to the amino group being present in the benzene radical Z in any event and the benzene radical Z being capable of containing still further substituents, and, on the other hand, with 1 mole of a diazo compound of the general formula

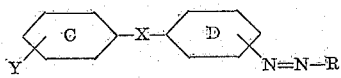

wherein X representse one of the groupings —NH.CO— and —CO.NH—, R represents the radical of an o-hydroxycarboxylic acid of the aryl series and Y stands for a diazo group, the nuclei C and D being capable of containing still further substituents.

The same dyestuffs are also obtained by diazotizing dyestuffs of the general formula

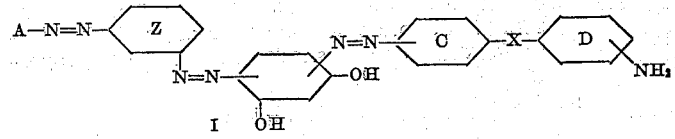

wherein A represents the radical of a diazo or coupling component, which may contain neither diazotisable amino groups nor carbon atoms capable of coupling, but which may contain azo groups, and wherein X stands for one of the groupings —NH.CO— and —CO.NH—, with the condition that one hydroxyl group must be present in the benzene radical B in o-position to the azo group I and that Z, C, and D may still contain further substituents, and by coupling the products so-obtained with o-hydroxycarboxylic acids of the aryl series.

The amino azo dyestuffs required for the preparation of the new dyestffs and having the general formula

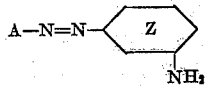

wherein A and Z have the above meanings, can be produced in different ways. Thus it is possible to couple for instance diazo compounds, which may contain azo groups, but no free amino groups, no acylated amino groups and no carbon atoms capable of coupling, with 1-hydroxy-2-aminobenzene acylated in the amino group and containing no substituents in 4-position or with derivatives thereof. By saponifying the acyl-amino group present in the coupling product the desired aminoazo dyestuffs are produced.

On the other hand, it is also possible to produce aminoazo dyestuffs corresponding to the above mentioned general constitution by coupling 1-diazo-3-acylamino-4-hydroxybenzenes or derivatives thereof with coupling components containing only one single grouping enabling the coupling, but containing no free or acylated amino groups and by subsequently saponifying the intermediate products so-obtained.

The dyestuffs obtainable according to the present invention dye cotton as well as regenerated cellulose in brown shades. By an after-treatment of the dyeings with metal-yielding agents the dyeings will be improved with respect to their fastness properties. Thus it is possible to considerably increase the light-fastness as well as the fastness properties in the moist state by an after-treatment of the dyeings with copper-yielding agents.

The present invention will now be described by way of examples, without however being limited thereto. The parts are by weight.

Example 1

22.3 parts of naphthionic acid are diazotized in the conventional manner and the so-obtained diazo compound coupled in the presence of sodium carbonate with a solution of 15.1 parts of 1-acetamino-2-hydroxybenzene, 13.3 parts of 30% caustic soda lye and water. The monoazo dyestuff is preciptated by addition of hydrochloric acid and filtered. It is saponified by heating with dilute sulfuric acid. The saponification product is filtered and washed with water. It possesses the probable formula

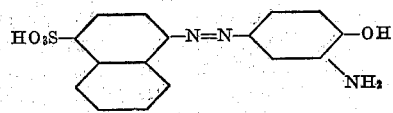

For the further diazotization of the monoazo dyestuff the same is dissolved in water and caustic soda lye. This solution is treated with a solution of 7 parts of sodium nitrite, the whole being caused to flow, while cooling and vigorously stirring, into hydrochloric acid. When the diazotization is complete, the diazo compound is coupled with a solution of 11 parts of resorcine in the presence of sodium carbonate. The disazo dyestuff is precipated by means of hydrochloric acid and filtered. It is dissolved in a mixture of water and sodium carbonate and coupled with the intermediate product obtainable in the conventional manner from 22.7 parts of 4.4'-diaminobenzanilide and 13.8 parts of salicyclic acid. The tetrakisazo dyestuff is precipitated by means of sodium chloride and filtered off. It constitutes, when dried, a dark powder dyeing cotton and regenerated cellulosic fibres in reddish-brown shades. When after-treated with copper-sulfate, the dyeings become reddish-brown, the fastness properties thereof to washing, to light, to acid and to alkali being considerably increased.

If, instead of naphthionic acid, 2-naphthylamine-6-sulfonic acid or 1-naphthylamine-6-sulfonic acid is used, dyestuffs of similar shades and fastness properties are obtained.

When using in this example, instead of the intermediate product resulting from 4.4'-diaminobenzanilide and salicylic acid, the diazo compound consisting of 37.6 parts of the dyestuff of the formula

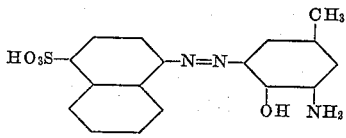

there will be obtained a dyestuff of similar fastness properties. It dyes cotton and regenerated cellulosic fibres in yellowish-brown shades which, when after-treated with copper sulfate, become brown.

Example 2

The diazo compound produced in the usual manner from 22.3 parts of naphthionic acid is combined with a solution of 16.5 parts of 1-methyl-3-acetamino-4-hydroxybenzene, 13.3 parts of 30% caustic soda lye and with water in the presence of sodium carbonate. The monoazo dyestuff is precipitated with sodium chloride and saponified by heating the mixture for several hours with dilute sulfuric acid. After cooling the monoazo dyestuff of the probable formula

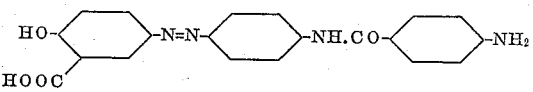

is filtered off and washed with water. It is dissolved in water and caustic soda lye, then treated with 7 parts of sodium nitrite and allowed to drop while stirring thoroughly at a low temperature into hydrochloric acid. After completion of the diazotization the diazo compound is coupled with a soda-alkaline solution containing 11 parts of resorcine. The diazo dyestuff is precipitated by addition of hydrochloric acid. It is dissolved in a mixture of water and sodium carbonate and coupled with the intermediate compound produced in the usual manner from 22.7 parts of 4.4'-diaminobenzanilide and 13.8 parts of salicylic acid. The tetrakisazo dyestuff is precipitated in the heat with sodium chloride, filtered and dried. It constitutes a dark powder dyeing cotton and regenerated cellulose in yellowish-brown shades.

When after-treated with copper sulfate, the dyeings become dark brown and their fastness properties to washing, to acid and to alkali will considerably be improved.

Example 3

9.3 parts of aniline are diazotized in the usual manner and coupled in the presence of sodium carbonate with a solution of 15.1 parts of 1-acetamino-2-hydroxybenzene, 13.3 parts of 30% caustic soda lye and with water. The monoazo dyestuff is thus precipitated and filtered off. It possesses the probable formula

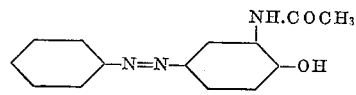

It is saponified by heating with dilute caustic soda lye, precipitated by means of hydrochloric acid and filtered off. The dyestuff is then suspended in water, a solution of 7 parts of sodium nitrite being added thereto and the suspension allowed to run into hydrochloric acid, while well stirring. After completion of the diazotization the diazo compound will be coupled with a solution of 11 parts of resorcine and water in the presence of sodium carbonate. The disazo dyestuff is precipitated and filtered off. It is dissolved in water under addition of caustic soda lye and coupled in the presence of sodium carbonate with the intermediate product produced in the usual way by interacting 22.7 parts of 4.4'-diaminobenzanilide and 13.8 parts of salicylic acid. The tetrakisazo dyestuff is precipitated, still warm, by addition of sodium chloride and filtered off. When dried, it is a dark powder which dyes cotton and regenerated cellulosic fibres in yellowish-brown shades. When after-treated with copper sulfate, the dyeings become brown, while the fastness properties thereof to washing, light and the alkali are substantially increased.

When using, instead of aniline, 12.1 parts of m-xylidine, a tetrakisazo dyestuff of similar properties is obtained, this dyestuff dyeing cotton and regenerated cellulose likewise in yellowish shades which are converted into brown shades by an after-treatment with copper salts.

Instead of aniline, also 2-aminotoluene-4-sulfonic acid, 1-aminobenzene-4-sulfonic acid, 1-aminobenzene-3-sulfonic acid or 1-aminobenzene-2-sulfonic acid may be used, whereby dyestuffs with similar shades and fastness properties are obtained.

Example 4

18.9 parts of 1-amino-2-hydroxybenzene-5-sulfonic acid are diazotized in the usual manner and coupled in the presence of sodium carbonate with 15.1 parts of 1-acetamino-2-hydroxybenzene, 13.3 parts of 30% caustic soda lye and water. The so-obtained monoazo dyestuff is precipitated by means of sodium chloride. In order to saponify the same it is heated with dilute caustic soda lye, then precipitated by addition of hydrochloric acid and filtered off. The dyestuff possesses the probable formula

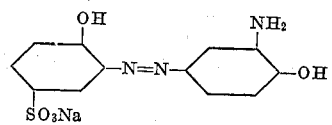

For further diazotization this dyestuff is suspended in water and, after addition of 7 parts of sodium nitrite, acidified with hydrochloric acid.

After completion of the diazotization the diazo compound is coupled with a solution of 11 parts of resorcine and of water in the presence of sodium carbonate. The disazo dyestuff is precipitated by means of hydrochloric acid and filtered off. The dyestuff is dissolved in a solution of water and sodium carbonate and coupled with the intermediate product produced in the usual way from 22.7 parts of 4.4'-diaminobenzanilide and 13.8 parts of salicylic acid. The tetrakisazo dyestuff is precipitated in the heat with sodium chloride, filtered off and dried. In this way a dark powder is obtained which dyes cotton and regenerated cellulose in reddish-brown shades, which, when after-treated with copper salts, become brown. Simultaneously the fastness properties in the moist state, to light, to acid and to alkali are substantially improved.

If in Example 4 the 1-amino-2-hydroxybenzene-5-sulfonic acid is replaced by 1-amino-2-hydroxy-5-nitrobenzene, there will be obtained a reddish-brown dyestuff, whose dyeings become dark brown on after-coppering the same and possess good fastness properties.

When in this example, instead of the intermediate product from 4.4'-diaminobenzanilide and salicylic acid, the diazo compound obtainable from 37.6 parts of the following dyestuff

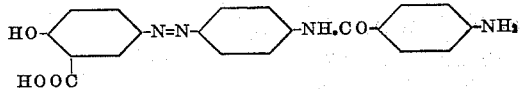

is used, there will be obtained a dyestuff dyeing cotton and regenerated cellulose in yellowish-brown shades. After-treated with copper sulfate these dyeings will be changed into brown and the fastness properties to washing, light, acid and to alkali are substantially improved.

*Example 5*

12.3 parts of 4-methoxy-1-aminobenzene are diazotized in a conventional manner and coupled in the presence of sodium carbonate with a solution consisting of 15.1 parts of 1-acetamino-2-hydroxybenzene, 13.3 parts of 30% caustic soda lye and water. The monoazo dyestuff thus precipitated is filtered off and saponified in the heat with dilute caustic soda lye. Then the whole is neutralized with hydrochloric acid, whereby the dyestuff is precipitated. This dyestuff of the following formula is filtered off, suspended in water, treated with 7 parts of sodium nitrite and acidified with hydrochloric acid. After completion of the diazotization the diazo compound is coupled with a solution of 11 parts of resorcine and water in the presence of sodium carbonate. The disazo dyestuff is precipitated by addition of hydrochloric acid, filtered and dissolved in water and sodium carbonate. The resulting solution is coupled with the intermediate product produced in the usual way from 22.7 parts of 4.4'-diaminobenzanilide and 13.8 parts of salicylic acid. The tetrakisazo dyestuff is precipitated in the heat by means of sodium chloride, filtered off and dried. In this way a dark powder is obtained which dyes cotton and regenerated cellulose in yellowish-brown shades which, on after-treatment with copper sulfate, become brown. The fastness properties to light, to acid as well as in the moist state are thus substantially improved.

When using, instead of 4-methoxy-1-aminobenzene, 2-methoxy-1-aminobenzene-5-sulfonic acid, a dyestuff of similar properties is obtained.

What we claim is:

1. A metallizable polyazo dyestuff of the formula

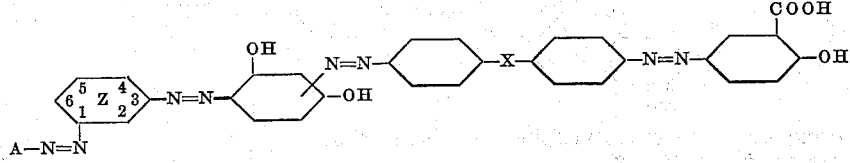

wherein A stands for a radical free from diazotizable amino groups and containing no carbon atoms capable of coupling, this radical being selected from the group consisting of substituted and unsubstituted benzene and naphthalene radicals, the benzene nucleus Z contains one hydroxy group in ortho-position to the azo group present in position 3, the free positions of the benzene nucleus Z being substituted by a member selected from the class consisting of hydrogen and alkyl, and X stands for a member selected from the group consisting of —NH.CO— and —CO.NH—.

2. A metallizable polyazo dyestuff of the formula wherein A stands for a radical free from diazotizable amino groups and containing no carbon atoms capable of coupling, this radical being selected from the group consisting of substituted and unsubstituted benzene and naphthalene radicals, the benzene nucleus Z contains one hydroxy group in ortho-position to the azo group present in position 3, and wherein X stands for a member selected from the group consisting of —NH.CO— and —CO.NH—.

3. A metallizable polyazo dyestuff of the formula wherein A stands for a radical free from diazotizable amino groups and containing no carbon

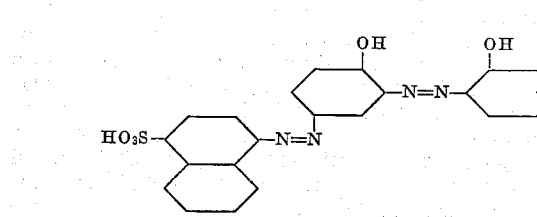

atoms capable of coupling, this radical being selected from the group consisting of substituted

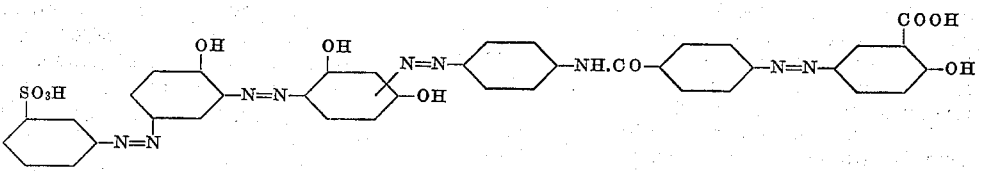

and unsubstituted benzene and naphthalene radicals and the benzene nucleus Z contains one hydroxy group in ortho-position to the azo group present in position 3.

4. A metallizable polyazo dyestuff of the formula

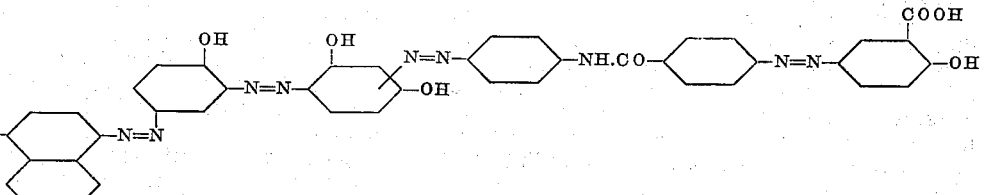

5. A metallizable polyazo dyestuff of the formula

6. A metallizable polyazo dyestuff of the formula

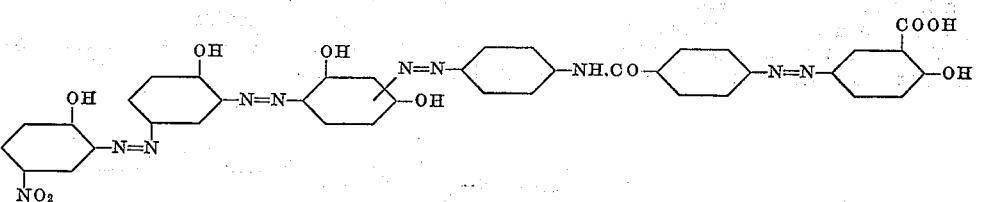

WALTER WEHRLI.
CHARLES PETITJEAN.

REFERENCES CITED

The following references are of record in the file of this patent:

UNITED STATES PATENTS

| Number | Name | Date |
|---|---|---|
| 2,127,678 | Delfs et al. | Aug. 23, 1938 |
| 2,196,028 | Roos | Apr. 2, 1940 |
| 2,226,675 | Straub et al. | Dec. 31, 1940 |
| 2,328,465 | Kopp | Aug. 31, 1943 |
| 2,394,114 | Siebert | Feb. 5, 1946 |